United States Patent [19]

Trutner et al.

[11] 4,350,722
[45] Sep. 21, 1982

[54] HOLLOW GLASS ARTICLE WITH IMPROVED OPTICAL FINISH

[75] Inventors: Donald G. Trutner, Chatham, N.J.; Luke Thorington, Easton, Pa.

[73] Assignee: Duro-Test Corporation, North Bergen, N.J.

[21] Appl. No.: 241,646

[22] Filed: Mar. 9, 1981

Related U.S. Application Data

[62] Division of Ser. No. 29,310, Apr. 12, 1979, Pat. No. 4,295,873.

[51] Int. Cl.³ ............................................. B65D 1/02
[52] U.S. Cl. ....................................... 428/35; 65/108; 65/82; 65/182.4; 65/116; 313/110; 313/112
[58] Field of Search .................. 313/110, 112; 65/102, 65/108, 110, 182.4, 359, 82, 65, 116; 428/35

[56] References Cited

U.S. PATENT DOCUMENTS

| | | | |
|---|---|---|---|
| 1,777,206 | 9/1930 | Burthe et al. | 65/108 X |
| 3,233,999 | 2/1966 | Mumford | 65/359 |
| 3,283,046 | 11/1966 | De Witt et al. | 65/108 X |
| 3,730,871 | 5/1973 | Boffe | 65/116 |
| 4,010,021 | 3/1977 | Foster | 65/359 X |
| 4,160,929 | 7/1979 | Thorington et al. | 313/112 |
| 4,295,873 | 10/1981 | Trutner et al. | 65/108 |

Primary Examiner—Arthur D. Kellogg
Attorney, Agent, or Firm—Darby & Darby

[57] ABSTRACT

A hollow glass article having an improved optical finish which is formed by placing a molten material in the original article while it is constrained in a mold. The molten material softens the glass and produces a hydrostatic pressure which reforms the article into the finished shape by expanding the original glass article to the shape of the mold.

4 Claims, 4 Drawing Figures

FIG. 1
FIG. 2
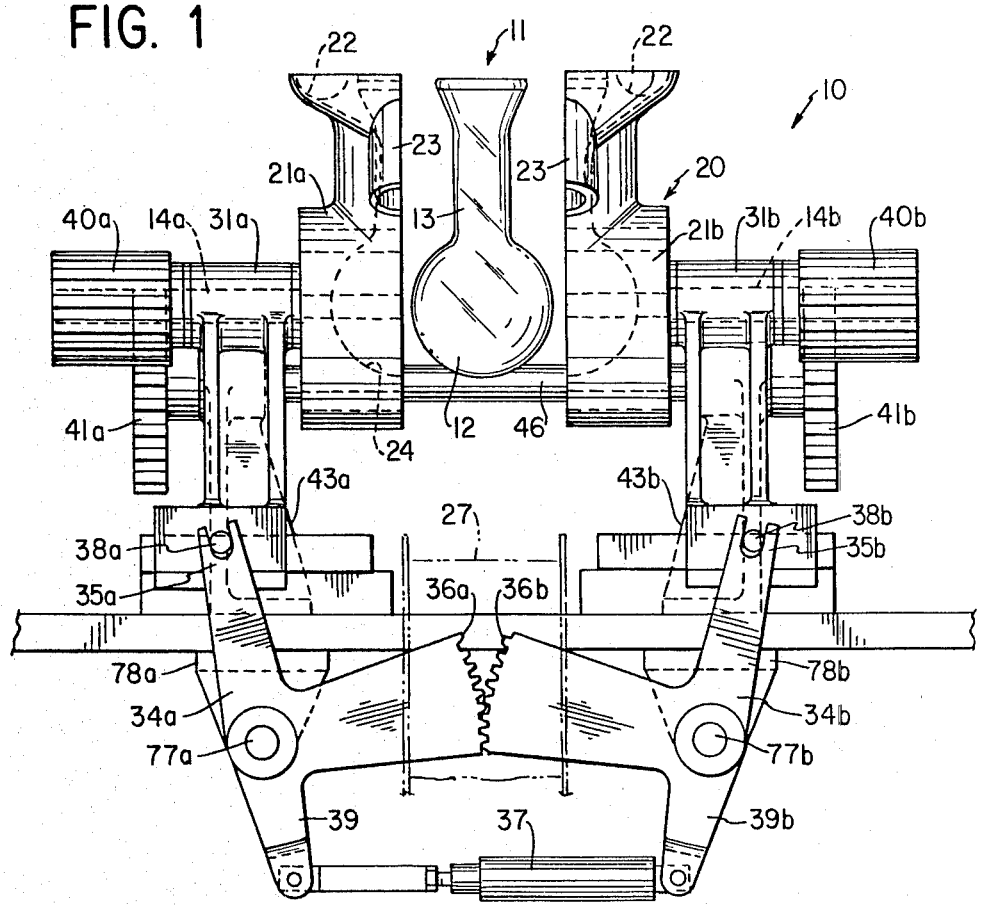
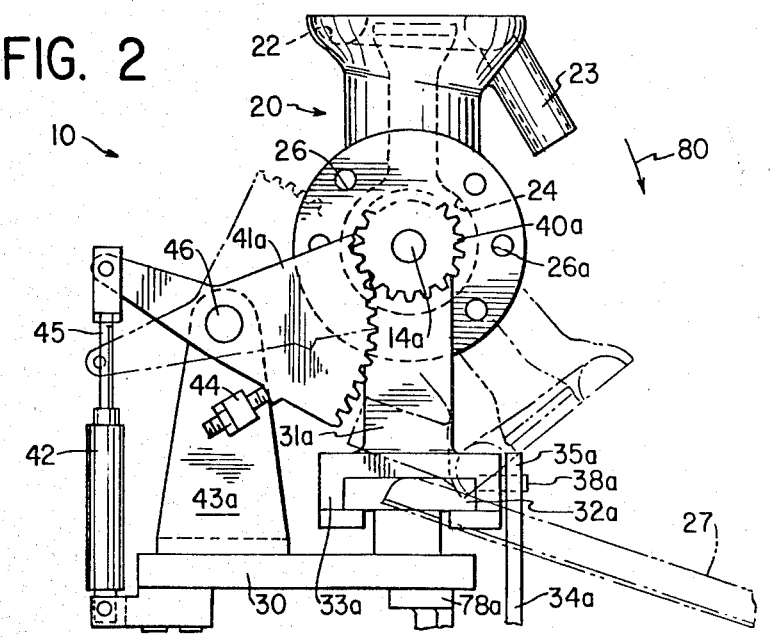

HOLLOW GLASS ARTICLE WITH IMPROVED OPTICAL FINISH

This application is a division of application Ser. No. 029,310, filed Apr. 12, 1979, now U.S. Pat. No. 4,295,873, granted Oct. 20, 1981.

The present invention relates to a method and apparatus for reworking a hollow workpiece to a desired dimensional accuracy and optical finish. The invention may advantageously be employed with bulbs such as those utilized for incandescent lamp bulbs.

In the conventional manufacturing technique, bulbs for incandescent lamps are blown in molds which are lined with a suitable layer of carbonizing material such as ground cork in an appropriate binder. However, serious disadvantages are inherent in the conventional bulb manufacturing technique. For example, it is difficult to apply and maintain the layer of carbonizing material either at a uniform thickness or accurately in relation to the axis of the bulb. Thus, bulbs produced in accordance with conventional techniques depart considerably from desired dimensions and contours. The variability in dimension of conventional incandescent lamp bulbs has not had a serious detrimental effect on their operation since conventional incandescent lamps merely require that the bulbs have sufficient transparency to allow passage therethrough of light emitted by the filament.

However, coatings capable of transmitting the visible portion of the electromagnetic radiation produced by the filament while at the same time reflecting radiation corresponding to the infrared portion of the spectrum are now available. In lamps with such coatings, reflection of infrared radiation back to the filament heats the filament and thereby increases the efficiency of the incandescent bulb. This results in energy conservation and reduced operating costs. Such a lamp is described in U.S. patent application Ser. No. 781,355, filed Mar. 25, 1977, now U.S. Pat. No. 4,160,929 which is assigned to the assignee of the subject application. The usefulness of such coatings is increased if the reflected infrared rays are accurately focused onto the filament. This can be accomplished by making the bulb of a desired optical reflecting shape, e.g. spherical or elliptical, and more optically perfect to reflect the IR energy to the filament. Heretofore, the variability in dimension and contour of the bulb has made it difficult to have a bulb which can accurately reflect infrared rays emitted from the filament back onto the filament. Accordingly, it is an object of the present invention to provide a method and apparatus for reworking bulbs to a higher degree of optical accuracy so that the bulb, after application of suitable coatings, is better capable of reflecting radiation to a predetermined location in the interior of the bulb. It is also a further object of the present invention to provide a method and apparatus for imparting an improved optical finish to bulbs.

BRIEF SUMMARY OF THE PRESENT INVENTION

In accordance with the present invention, a method and apparatus for reworking a hollow workpiece, such as a glass bulb, to a desired dimensional accuracy is provided. Fluid, illustratively molten metal, of a temperature sufficient to soften the bulb material is poured into a workpiece which is disposed within a mold of desired dimensions. The fluid is of sufficient density so that the static pressure of the fluid causes the softened bulb to contact the mold and thereby take on the dimensions of the mold. The softened workpiece is then cooled so that the workpiece may be handled without deforming.

Heretofore, floating of glass on a bath of molten metal has been utilized to produce sheets of flat glass. U.S. Pat. Nos. 3,083,551 and 3,222,154 to L. A. B. Pilkington teach a method of manufacturing flat glass wherein glass is introduced to a bath of molten metal of temperature sufficient to melt the glass. The molten glass advances along the bath of molten metal and flows laterally across the bath until it reaches a condition of equilibrium and stable thickness. The molten glass continues to move along the bath and is sufficiently cooled so that it may be removed from the bath by mechanical means as a sheet of flat glass. However, Pilkington only teaches flotation of molten glass on a bath of molten metal to produce a sheet of flat glass.

BRIEF DESCRIPTION OF THE DRAWINGS

For a further understanding of the present invention reference is made to the accompanying drawings in which:

FIG. 1 is a front elevational view of a preferred embodiment of the apparatus in accordance with the present invention;

FIG. 2 is a side elevational view of a portion of the apparatus of FIG. 1;

DETAILED DESCRIPTION OF A PREFERRED EMBODIMENT

Figure 3:
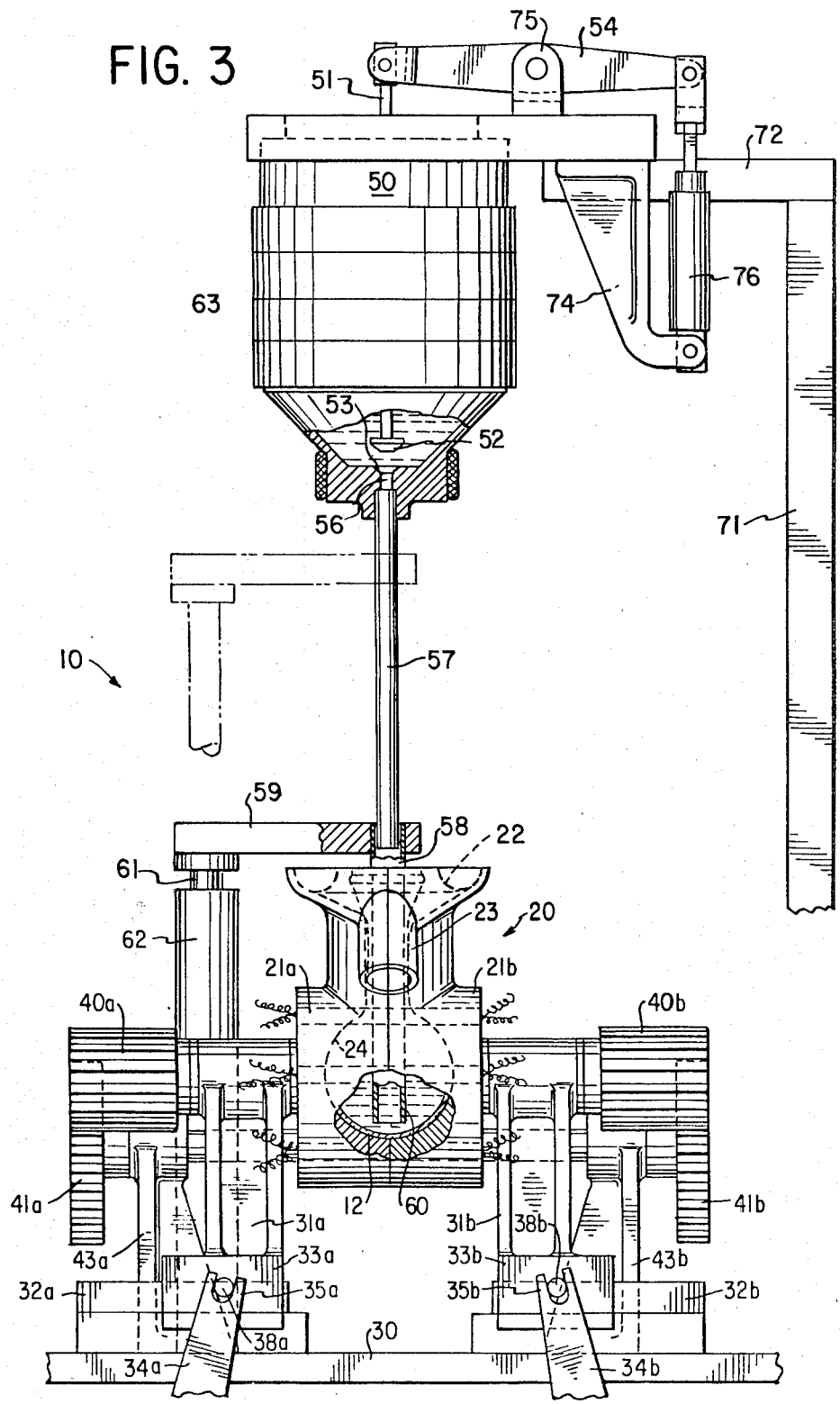
FIG. 3 is a front elevational view of the apparatus of FIG. 1 with the mold portions in closed position and further depicting a reservoir having a vertically displaceable extension tube.

Referring now to the drawings, and in particular to FIG. 1, the apparatus is generally designated 10. A mold 20, having a cavity 24 of desired contour and dimension, is separable into two mold portions 21a, 21b. As depicted, mold portions 21a, 21b are mirror images of one another. However, it should be understood that the mold may take a variety of alternative forms. For example, the mold may comprise a plurality of symmetric or non-symmetric members capable of being joined to define the desired mold cavity shape. Hollow workpiece 11, of any desired shape, but preferably of a shape generally conforming to that of the mold, is introduced into cavity 24 of mold 20 by separating mold portions 21a, 21b, aligning workpiece 11 with cavity 24 and then enclosing mold portions 21a, 21b around workpiece 11. The mold cavity 24 is slightly larger than the raw workpiece so that the workpiece is not damaged when the mold portions 21a,21b are enclosed. As depicted in FIG. 1, workpiece 11 comprises a bulb having a generally spherical portion 12 terminating in a tubular portion 13. Mold cavity 24 has a shape corresponding with workpiece 11.

In the preferred embodiment, the dimensional accuracy of mold cavity 24 is made such as to be able to produce a bulb 11 capable of accurately reflecting radiation emitted from a filament back to the filament.

Each mold portion 21a, 21b is mounted to a corresponding mold support 31a, 31b so that both mold portions 21a, 21b may be rotated about a common horizontal axis which approximately passes through a horizontal diameter of spherical portion 12 of bulb 11. It should be understood, however, that the axis about which mold 20 rotates need not pass through a diameter of spherical portion 12 of bulb 11.

Mold portions 21a, 21b are rotatably mounted to mold supports 31a, 31b by respective shafts 14a, 14b extending from each mold portion 21a, 21b and seated within channels provided in mold supports 31a, 31b. Suitable bearings may be utilized to minimize frictional resistance. Shafts 14a, 14b run through mold supports 31a, 31b and are each affixed to a respective pinion gear 40a, 40b. Thus, each mold portion 21a, 21b rotates about a common horizontal axis in fixed relation with the respective pinion gear 40a, 40b.

Segment gears 41a, 41b are rotatably mounted on brackets 43a, 43b affixed to a frame 30. Segment gears 41a, 41b are affixed to a common shaft 46 so that segment gear 41a moves in fixed relationship with segment gear 41b. As seen in FIG. 2, segment gear 41a is mounted to bracket 43a at an intermediate position of segment gear 41a. At one end, segment gear 41a is affixed to piston rod 45 of pneumatic cylinder 42a. Upon actuation and lowering of piston rod 45, segment gears 41a, 41b rotate about shaft 46. Teeth on segment gears 41a, 41b intermesh with teeth of the corresponding pinion gears 40a, 40b. The lowering of piston rod 45 results in upward displacement of the toothed portion of segment gears 41a, 41b. This in turn causes pinion gears 40a, 40b and mold portions 21a, 21b to rotate downwardly in the direction of arrow 80.

As shown in FIG. 1, each respective mold portion 21a, 21b is provided with gearing 40a, 40b, 41a, 41b capable of rotating respective mold portion 21a, 21b. Mold portions 21a, 21b are rotated together and in fixed relationship to one another to prevent relative motion between the mold portions 21a, 21b. Any relative motion between respective mold portions 21a, 21b would produce undesirable stress and possible breakage of the workpiece 11 contained within cavity 24 of mold 20. Accordingly, in the present embodiment, segment gears 41a, 41b are affixed to a common shaft 46 so that segment gears 41a, 41b rotate in fixed relationship to one another. It should be apparent, however, that a variety of alternative mechanisms may be provided to rotate mold portions 21a, 21b in unison. For example, mold portions 21a, 21b may be urged together with pressure sufficient to prevent relative motion between the mold portions 21a, 21b at the point where they contact each other. Thus, by rotating one of mold portions 21a, 21b, the remaining mold portion 21b, 21a will also rotate.

In combination with the axial rotating means, mold portions 21a, 21b are laterally separated to allow placement therebetween of workpiece 11. Mold supports 31a, 31b are provided with guides 33a, 33b which are slidably seated on tracks 32a, 32b mounted to frame 30. Thus, mold supports 31a, 31b and their rotatably fixed mold portions 21a, 21b are displaceable along the path of tracks 32a, 32b. As shown in FIG. 2, guides 33a, 33b are depicted as generally C-shaped members and tracks 32a, 32b are depicted as generally T-shaped members having rectangular upper portions. In the preferred embodiment, tracks 32a, 32b are mounted to frame 30 along a common longitudinal axis so that upon inward displacement, mold portions 21a, 21b come together in proper alignment to define a continuous cavity 24. Furthermore, adjoining faces of mold portions 21a, 21b are fitted to one another to avoid creation of a seam at the interface of mold portions 21a, 21b.

To achieve proper alignment of mold portions 21a, 21b, each must track a well-defined path. Any free play, in either the vertical or horizontal axes, may result in undesirable misalignment of the mold portions. In the present invention, the arrangement of C-shaped guides 33a, 33b which slidably mate with T-shaped tracks 32a, 32b advantageously avoids free play in either the horizontal or vertical directions. As seen in FIG. 2, the top and bottom walls of guides 33a, 33b prevent vertical displacement of mold supports 31a, 31b while the side walls of guides 33a, 33b prevent horizontal displacement.

Mold portions 21a, 21b are displaced along their respective tracks 32a, 32b by a pair of lever arms 34a, 34b. Each lever arm 34a, 34b is pivotally mounted to a bracket 78a, 78b at pivot 77a, 77b. Lever arms 34a, 34b each comprise a generally T-shaped member. A slotted end 35a, 35b of lever arm 34a, 34b engages a pin 38a, 38b affixed to mold support 31a, 31b and segment gear 36a on lever arm 34a intermesh with segment gear 36b on corresponding lever arm 34b. The lower end 39a, 39b of each respective lever arm 34a, 34b is connected to a cylinder 37. Upon extension of the piston of cylinder 37, the respective slotted ends 35a, 35b move inwardly bringing mold portions 21a, 21b into contact. The alignment of tracks 32a, 32b along a common longitudinal axis and the utilization of C-shaped guides 33a, 33b bring mold portions 21a, 21b together in horizontal and vertical alignment. It should be understood however that a variety of alternative arrangements may be utilized to effect vertical and horizontal alignment of mold portions 21a, 21b. For example, mold portion 21a may have indentations and/or protrusions which mate with corresponding protrusions and/or indentations on the other mold portion 21b.

Separation of the respective mold portions 21a, 21b is effected by retracting the piston of cylinder 37. This causes slotted ends 35a, 35b of lever arms 36a, 36b to move away from each other, thus separating the respective mold portions 21a, 21b.

In combination with mold 20, reservoirs or tanks 50 are provided. As seen in FIG. 3, each reservoir 50, is supported by support members 71, 72 and 73. A lever 54 is pivotably mounted, at an intermediate portion thereof, to bracket 75 affixed to support member 73. One end of lever 54 is connected to the rod of a hydraulic cylinder 76 mounted on support member 72 by bracket 74. At the opposite end of lever 54, rod 51 extends vertically downward through reservoir 50. At its lowermost portion, rod 51 is connected to a plug 52 fitted within seat 53 at a lower portion of reservoir 50. Extension of cylinder 76 moves rod 51 downwardly so that plug 52 is urged against seat 53, creating a seal which shuts off the supply of fluid contained within reservoir 50. Tube 57 extends downwardly from spout 56 of reservoir 50. An extension tube 58, slidably fitted to tube 57, is capable of telescoping from tube 57 to provide a downwardly extending extension for tube 57. In FIG. 3 the solid lines depict extension tube 58 in a full down position and the dotted lines depict extension tube 58 in a full up position. Tube 58 has an outer diameter smaller than the inner diameter of the narrowest part of tubular portion 13 of bulb 11. Thus it is possible to extend extension tube 58 to the bottom of a spherical portion 12 of bulb 11. Vertical displacement of extension tube 58 is achieved by an arm 59 affixed to an upper portion of extension tube 58. An opposite end of arm 59 is affixed to a rod 61 which is vertically displaceable by means of cylinder 62.

In an alternative embodiment (FIG. 4), reservoir 50 empties out directly through tube 57. In this embodiment, the lowermost opening of tube 57 is vertically aligned with the opening of mold 20. On lifting plug 52, fluid contained within reservoir 50 falls directly into the center of workpiece 11.

In the preferred embodiment, heating elements are utilized to heat the mold 20 and tank 50. Heating elements 63 are provided around the perimeter of each reservoir 50. Each mold portion 21a, 21b is provided with channels 26a, 26b running therethrough. Electrical heating elements of a conventional type are inserted within the channels.

The heating elements are connected by conventional wires 25a, 25b to a compatible power source. It should be apparent however that the heating means may take a variety of alternative forms, electrical or otherwise.

The operation of the apparatus and the method in accordance with the present invention is now described. As shown in FIG. 1, apparatus 10 is arranged with mold portions 21a, 21b separated. Mold portions 21a, 21b are stabilized at a desired temperature by utilization of conventional heating means disposed within channels 26 of mold portions 21a, 21b. For a glass workpiece, the molds are stabilized at approximately 650° C. (hereinafter °C.). The mold is purged with an inert gas to minimize oxidation of the fluid, illustratively molten metal which is introduced into the interior of workpiece 11. A gas supply of any conventional type may be utilized. In the preferred embodiment, the inert gas comprises nitrogen gas. After purging of the mold, a raw workpiece 11, illustratively a lamp bulb, is suspended in alignment with cavity 24 of mold 20. Raw workpiece 11 generally has imperfections in its dimensions and contours. Mold portions 21a, 21b are joined to contain raw workpiece 11 within mold cavity 24. It should be apparent to those skilled in the art, that the mechanism for suspending workpiece 11 in alignment with cavity 24 of mold 20 may take a variety of alternative forms. For example, workpiece 11 may be supported by a member (not shown) having expandable fingers which extend through tubular portion 13 of workpiece 11 gripping an interior portion of bulb 11 and retaining the bulb in alignment with mold portions 21a, 21b.

The mold portions 21a, 21b are joined together by actuation and extension of the piston of cylinder 37. This causes lever arms 34a, 34b to rotate bringing the slotted ends 35a, 35b of each lever arm 34a, 34b and the respective mold portions 21a, 21b inward.

After mold portions 21a, 21b close over workpiece 11, workpiece 11 is purged by an inert gas jet, preferably nitrogen, which advantageously minimizes oxidation of the fluid, illustratively molten metal, which is introduced into the interior of workpiece 11.

Mold 20 is then brought into vertical alignment with a first reservoir 50 (FIG. 3) so that extension tube 58 is aligned with the opening of mold 20 and workpiece 11. The first reservoir 50 contains fluid of a temperature sufficiently high to soften the workpiece and of density sufficient to exert static pressure on the workpiece to bring the workpiece into contact with the mold. Heating elements 63 advantageously supply the necessary heat. In a preferred embodiment, the workpiece 11 comprises a lamp bulb of glass construction. For such a workpiece, a fluid of approximately 900° C. will adequately soften the glass bulb. Molten tin of approximately 900° C. advantageously provides both desired fluidity and sufficient density to force the softened glass into contact with the interior surface of mold 20.

After vertically aligning extension tube 58 with tubular portion 13 of bulb 11, cylinder 62 is actuated to bring extension tube 58 into the interior of lamp bulb 11. Since the outer diameter of extension tube 58 is less than the inner diameter of the narrowest portion of tubular portion 13 of bulb 11, extension tube 58 enters the interior of workpiece 11 unhindered. After extension tube 58 is lowered into the interior of workpiece 11, outlet 60 is located near the bottom of spherical portion 12 of bulb 11 (FIG. 3).

The high temperature fluid (first charge) is introduced into the interior of the workpiece 11 by actuating cylinder 76. As shown in FIG. 3, actuation of cylinder 76 lifts plug 52 from seat 53 and allows the high temperature fluid to flow through outlet 60 into the interior of workpiece 11. After introduction of the high temperature fluid into workpiece 11, cylinder 62 is again actuated to raise extension tube 58 out of workpiece 11. Introduction of the high temperature fluid into the interior of workpiece 11 from outlet 60 of extension tube 58 located at a lower interior portion of the workpiece advantageously avoids undesirable splashing and hammering effects which can otherwise occur if fluid is allowed to freely fall into the interior of workpiece 11 from above.

Figure 4:
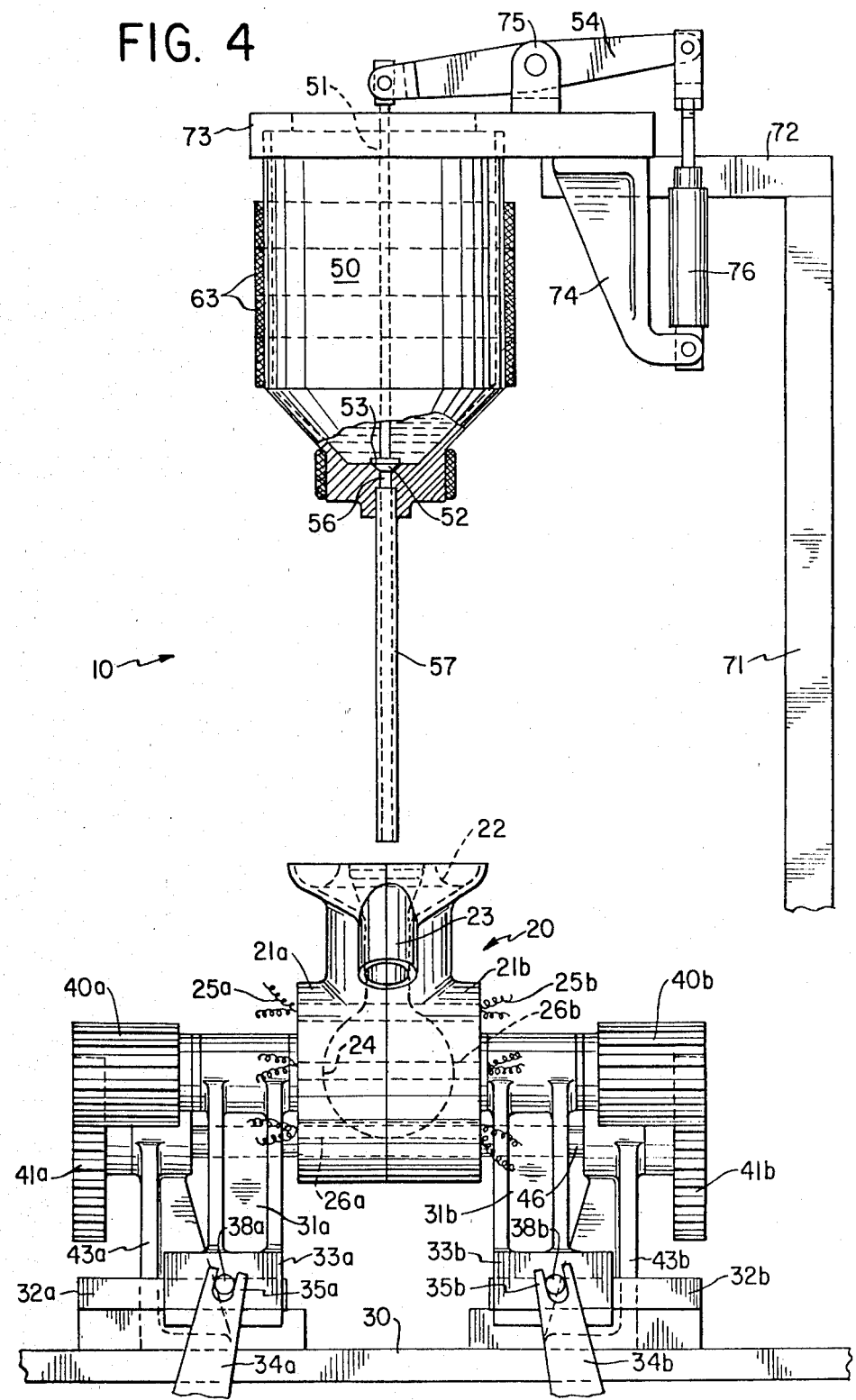
FIG. 4 is a front elevational view of the apparatus of FIG. 1 showing an alternative embodiment of the reservoir.

It should be apparent that the alternative embodiment in accordance with FIG. 4 may be utilized to introduce high temperature fluid from tube 57 directly to workpiece 11 in instances where the freely falling fluid does not create undesirable splashing and hammering effects.

An annular gutter 22 encompassing the top portion of mold 20 catches excess molten tin and directs it through a spill pipe 23 for collection on collection trough 27. The high temperature of the molten tin softens the glass and the static pressure of the molten tin forces the glass into contact with the interior surface of mold cavity 24. Thus, imperfections in the dimensions of the raw lamp bulb 11 are eliminated since the softened lamp bulb takes on the dimensions of the interior surface of mold cavity 24.

After it is softened and takes on the dimensions of the interior surface of mold cavity 24, workpiece 11 is sufficiently cooled so that it can be handled without deforming. In the preferred embodiment, the workpiece is cooled by introducing fluid of a temperature lower than the high temperature fluid into the workpiece. However, it should be apparent that cooling of the workpiece can be accomplished in a variety of alternative ways.

In the preferred embodiment, apparatus 10, containing workpiece 11 filled with fluid of temperature sufficiently high to soften the workpiece, is aligned with a second reservoir 50 in accordance with FIG. 3. The second reservoir 50 is of similar or identical construction to the first reservoir 50. It will be apparent that in aligning apparatus 10 with the first and second reservoirs 50 that either the apparatus or the reservoirs can be moved. The second reservoir 50 is provided with a vertically displaceable extension tube 58 which telescopes from the outlet end of tube 57. Displacement of extension tube 58 is controlled by a lever arm 59 responsively connected to rod 61 of cylinder 62. The outer diameter of extension tube 58 is less than the inner diameter of the narrowest portion of tubular portion 13 of bulb 11.

After aligning extension tube 58 with tubular portion 13 of bulb 11, cylinder 62 is actuated to bring extension tube 58 into the interior of lamp bulb 11 which is filled with high temperature fluid. As shown in FIG. 3, upon actuation of cylinder 62, the outlet 60 of extension tube 58 is located near the bottom of spherical portion 12 of bulb 11.

Fluid in the second reservoir 50 is maintained at a lower temperature than in the first reservoir. In the present embodiment, the second reservoir contains molten tin of approximately 650° C. Heating means such as those utilized with the first reservoir 50 may be utilized to maintain the fluid in the second reservoir at a desired temperature. Upon actuation of cylinder 76 and lifting of plug 52 from seat 53, the molten tin of 650° C. flows through tube 57, extension tube 58 and outlet 60 of extension 58. As the molten tin flows into the lower portion of workpiece 11, it displaces the high temperature fluid out of workpiece 11. The high temperature molten tin overflows the top of tubular portion 13 of bulb 11 and enters annular gutter 22 of mold 20 and spillpipe 23 for removal via collection trough 27. The overflow may advantageously be recycled to either the first or second reservoirs.

The molten tin of lower temperature (second charge) displaces the high temperature molten tin from the workpiece and cools the glass bulb sufficiently so that it may be handled without deforming. After bulb 11 is filled with the lower temperature tin, cylinder 62 is again actuated to bring extension tube 58 out from the interior of bulb 11. After cooling the bulb, the contained fluid is decanted by actuating cylinder 42 to rotate mold 20 downwardly as shown in FIG. 2. During the initial stages of the downward rotation, fluid contained within the interior of bulb 11 flows through spillpipe 23 and onto collection trough 27. However, as the angular rotation increases, fluid contained within the interior of bulb 11 begins to pour directly from the rim of the annular gutter 22 to collection trough 27 bypassing spillpipe 23. Bulb 11 shrinks slightly during cooling so that, in the cool state, mold cavity 24 is slightly larger than bulb 11.

It should be apparent that the composition and temperature of the high and lower temperature fluids will vary depending on the composition of the workpiece utilized. Accordingly, the reference to molten tin of approximately 650° C. and 900° C. is by way of illustration for glass bulbs.

A stop 44 of conventional type may be utilized to define the limits of the arcuate path of rotating mold 20. After any contained fluid is removed from the interior of the workpiece, the reworked workpiece is removed from mold 20 by separation of mold portions 21a, 21b. A mechanism of any conventional type may be utilized to retain the workpiece in place while mold portions 21a, 21b are separated. As previously indicated, a member having expandable fingers may be inserted into the hollow interior of the workpiece with its fingers retracted. Once inside the workpiece, expansion of the fingers against the interior walls of the workpiece retains the same in place. It should be understood that removal of the workpiece from the mold can take place while the workpiece is in the downwardly rotated position, in the full vertical position, or at any intermediate position therebetween.

The method and apparatus in accordance with the present invention is easily adapted to conventional manufacturing techniques. For example, an economical assembly line production method utilizes a plurality of apparatuses 10 arranged around a circular turntable. Illustratively, the method in accordance with the present invention may be performed at eight stations with utilization of eight apparatuses 11 arranged on a turntable. At each position a single operation is performed and upon completion of the operation the turntable rotates bringing each apparatus 11 to a new station where the next step is performed. Thus, eight different operations are performed simultaneously.

Illustratively, operations performed with an eight station setup would be as follows. At position one, the mold is purged with inert gas under pressure, the workpiece 11 is loaded by the operator and the mold portions 21a, 21b are closed over the workpiece 11.

The apparatus 11 then moves on to position 2 where the interior of workpiece 11 is purged of air by use of an inert gas jet.

At position 3, the mold is aligned with a first reservoir 50 in accordance with FIG. 3. Extension tube 58 is lowered into the interior of workpiece 11 by actuation of cylinder 62 and fluid of temperature sufficiently high to soften the workpiece is introduced into the interior of bulb 11 from the reservoir. After workpiece 11 is charged with high temperature fluid, extension tube 58 is raised out of workpiece 11.

At position 4, heat transfer from the high temperature fluid to the workpiece softens the workpiece. The static pressure of the fluid forces the workpiece, illustratively glass, into contact with the interior surface of the mold 20.

At position 5, the mold is aligned with a second reservoir 50 in accordance with FIG. 3. Cylinder 62 is actuated bringing extension tube 58 into the interior of bulb 11 and fluid of lower temperature is introduced into the interior of bulb 11 at the outlet 60 of extension tube 58 located near the bottom of spherical portion 13 of bulb 11. The overflow of high temperature fluid is directed through spillpipe 23 and onto collection trough 27 for recycling.

At position 6, the lower temperature fluid reduces the temperature of the glass sufficiently to allow handling without deformation.

At position 7, mold 20 is downwardly rotated to decant the molten tin onto a collection trough 27.

Finally, at position 8 the mold opens and the reworked bulb is removed. The apparatus 10 returns to position 1 with the mold portions 21a, 21b open and ready to receive another workpiece 11.

It should be apparent that the present invention may take a variety of alternatve forms and that the foregoing description is merely illustrative. Accordingly, the scope of protection afforded the present invention is defined by the annexed claims.

What is claimed is:

1. A hollow glass article of improved optical finish formed by depositing in the original article constrained in a mold through an opening therein a molten liquid material of a temperature sufficient to soften the glass and produce a hydrostatic pressure therein which reforms the original article into the finished article by expanding the original article to the shape of the mold.

2. A hollow glass article as in claim 1 wherein the article is formed by removing the first named molten liquid and depositing a second liquid of a lower temperature which permits the glass to harden.

3. A hollow glass article as in claim 1 whose major portion is generally spherical.

4. A hollow glass article as in claim 1 wherein the molten liquid material deposited in the original article is a metal.

* * * * *